United States Patent [19]

Mokadam

[11] Patent Number: 5,797,456
[45] Date of Patent: Aug. 25, 1998

[54] SURFACTANT ADDITIVE FOR OIL FIELD ACIDIZING

[75] Inventor: Anita R. Mokadam, Houston, Tex.

[73] Assignee: Nalco/Exxon Energy Chemicals, L.P., Sugarland, Tex.

[21] Appl. No.: 512,474

[22] Filed: Aug. 8, 1995

[51] Int. Cl.$^6$ .................................................. E21B 43/27

[52] U.S. Cl. .......................... 166/307; 507/255; 507/259; 507/265; 507/267; 507/933

[58] Field of Search ...................................... 166/271, 307; 507/255, 259, 265, 267, 933, 934

[56] References Cited

U.S. PATENT DOCUMENTS

| | | | |
|---|---|---|---|
| 2,927,639 | 3/1960 | Schuessler et al. | 166/307 X |
| 3,873,452 | 3/1975 | Donham | 166/307 X |
| 4,137,972 | 2/1979 | McLaughlin et al. | 166/307 |
| 4,167,214 | 9/1979 | Street, Jr. | 166/307 |
| 4,290,901 | 9/1981 | Royle | 166/307 X |
| 5,543,387 | 8/1996 | Mokadam et al. | 507/933 X |

Primary Examiner—George A. Suchfield
Attorney, Agent, or Firm—Thomas M. Breininger; Kelly L. Cummings; Robert L. Graham

[57] ABSTRACT

Subterranean oil-bearing formations are treated with aqueous acid solutions which include an effective amount of an ester or salts of sulfonated fatty acids, which exhibits both antisludge and demulsification properties.

12 Claims, No Drawings

SURFACTANT ADDITIVE FOR OIL FIELD ACIDIZING

BACKGROUND OF THE INVENTION

This invention relates generally to the use of surface active agents (surfactants) in oil field acidizing operations to reduce emulsion and sludge formation in such operations. In one aspect, the invention relates to a method of acidizing subterranean formations using esters or salts of sulfonated fatty acids.

Acidizing is a well treatment operation wherein an acid solution is injected into a subterranean formation to dissolve formation minerals and foreign material and thereby improve the productivity of the formation. The acidizing treatment may be by matrix acidizing or acid fracturing. A problem associated with these treatments is the tendency of the acid or reaction products to form sludge which can reduce the effectiveness of the treatment or plug the formation or production equipment. "Sludge" is a generic term used in the industry that encompasses insoluble components that precipitate out of the crude oil upon contact with the acid solution. These insoluble components include asphaltenes, maltenes, resins, paraffins and other hydrocarbons. Precipitation of these materials is aggravated by the presence of ferric compounds or $Fe^{3+}$ ions that enter the acid solution through corrosion.

Another problem associated with oil field acidization is the formation of emulsions resulting from reacted acid contacting formation crude oil. These emulsions, particularly those stabilized by fines, exhibit high viscosity and can impede the flow of formation liquids to the wellbore.

The emulsions and sludges formed in acidizing operations not only reduce the effectiveness of the acid treatment, but can plug the formation and production equipment.

Efforts to counteract sludge and emulsion formation have involved the use of antisludge agents and/or demulsifiers in the acid solution.

Typical antisludge agents are as follows:
(a) amphophile compounds (alkyl benzyl derivatives) disclosed in SPE Paper No. 25185, "Asphaltene Stabilization in Alkyl Solvents Using Oil-Soluble Amphophiles";
(b) ethoxylated alkyl phenol disclosed in U.S. Pat. No. 4,823,874; and
(c) dodecylbenzene sulfonate disclosed in U.S. Pat. No. 4,073,344.

A wide variety of surface active agents (surfactants) have been used in acid treatment as demulsifiers. The text book *Acidizing Fundamentals*, by B. B. Williams, J. L. Gidley, and R. R. Schechter, on pages 95 and 96, discloses the use of surfactants as demulsifying agents. The surfactants indicated are organic amines and salts of quaternary amines and polyoxyethylated alkyl phenols. The same publication also discloses the use of antisludge agents in acidizing, particularly for treatment in fields containing heavy asphaltic oils. The suggested surfactants for alleviating this problem are alkyl phenols and fatty acids. U.S. Pat. No. 4,073,344 also suggests the use of ethoxylated nonylphenol as a surfactant in acidizing operations. U.S. Pat. Nos. 4,018,278 and 2,828,334 disclose the use of surfactants such as alkylpyridinium, alkylsulfates, alkylaryl-sulfates, ethoxylated alkylarylsulfates, alkyl sulfonates and alkylaryl sulfonates in well treatments.

As indicated above, the present invention relates to the use of esters or salts of sulfonated fatty acids. A paper entitled "The Increasing Importance of Methyl Ester Sulfonates as Surfactants" by Ned M. Rockwell and Y. K. Rao describes compounds useable in the method of the present invention. The paper was presented at the 1994 World Lauric Oils Conference in Manila, The Philippines. This reference does not disclose the use of these compounds in acidizing of subterranean formations.

Because of their different functionality, separate antisludge agents and demulsifiers are frequently used in treating acid solutions. A surfactant which provides for both antisludge and demulsification would not only simplify the treatment, but would also improve the acidizing operation. Also, a surfactant possessing such bifunctional properties (e.g. antisludge and demulsification) could reduce the amount of additives required in the treatment.

SUMMARY OF THE INVENTION

The method of the present invention involves the acid stimulation of subterranean oil bearing formations wherein an acid solution is injected through a wellbore and into the formation. In accordance with the present invention, the acid solution contains an effective amount of a water dispersible anionic surfactant having the formula of

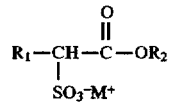

where $R_1$ is a linear or branched alkyl group having from 4 to 24 carbon atoms, preferably from 6 to 18 carbon atoms, most preferably 8 to 16 carbon atoms;

$R_2$ is selected from an alkyl group having from 1 to 12 carbon atoms, (preferably 1 to 4 carbon atoms) or $M^+$; $M^+$ is selected from ammonium, amines, ethanolamines, or a metal mono or di cation, preferably $Na^+$, $K^+$, $Ca^{++}$, or $Mg^{++}$.

The concentration of the surfactant in the acid solution is sufficient to reduce sludge formation. Surprisingly, it has been discovered that the surfactant also exhibits demulsification properties.

DESCRIPTION OF THE PREFERRED EMBODIMENTS

In accordance with the present invention, acids used in the treatment of subterranean formations contain an ester or salts of sulfonated fatty acid sulfonate. For convenience, this surfactant will be referred to herein as "Sulfonated Surfactant", it being understood that the ester and salt of the sulfonated fatty acid is also embraced by this term.

The method of the present invention will be described with reference to (A) the Acid System, (B) the description of the Sulfonated Surfactant and formulation, (C) Method of Preparation, (D) Acidizing Operations, and (E) Experiments.

A. Acid Systems

As mentioned above, the method and formulation of the present invention employs a bifunctional surfactant in the acid system used in the acidizing of subterranean formations. Any of the known oil field acids may be used. These are referred to herein as "well treating acids" and include aqueous solutions of inorganic acids such as hydrochloric acid (HCl), hydrofluoric acid (HF), mixtures of HCl and HF (i.e. mud acid), and organic acids such as acetic acid, formic acid, and anhydrides. The most common acids are 3% HCl, 7½% HCl, 15% HCl, 28% HCl, and blends of HCl and HF (mud acid). Mud acid is normally a blend of 6 to 12% of HCl and 1½ to 6% HF.

B. Sulfonated Surfactant

The surfactant used in the method of the present invention has the following formula (I):

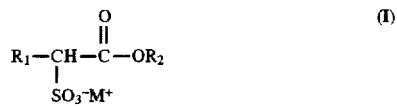

where $R_1$, $R_2$ and $M^+$ are as described above.

The variables in Formula I include the alkyl tail, the $R_2$, and the cation.

Preferred alkyl groups are branched alkyl groups including those derived from fatty acids having alkyl chains ranging from 4 to 24 carbon atoms. These include saturated and unsaturated fatty acids. Specific fatty acids include lauric, palmatic, stearic, and fatty acids derived from animal or vegetable fat or oil such as tallow ($C_{16}$–$C_{18}$), coconut oil ($C_{12}$–$C_{15}$), and tall oil. The preferred cation is selected from the alkali metals such as sodium.

In preferred embodiments, the Sulfonated surfactant is a sodium alpha-sulfo methyl laurate or disodium alpha-sulfo laurate having the following Formulas (II and III):

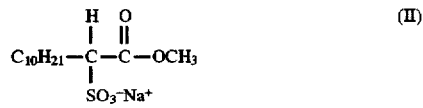

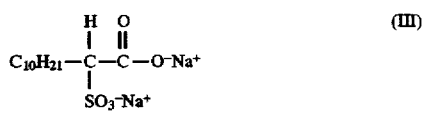

These products are available commercially from Stepan Company and are marketed under the trade designation of ALPHA-STEP®ML-40.

In another preferred embodiment, the surfactant is sodium alpha-sulfo methyl cocoate (ester) or disodium alpha-sulfo cocoate (salt).

The preferred surfactants are the alpha sulfo fatty acids where the fatty alkyl group is derived from lauric oils or tallow.

These products are available commercially from Stepan Company and are marketed under the trade designation of ALPHA-STEP®MC-48.

C. Method of Preparation

As indicated above, some of the sulfonated surfactants useable in the present invention are commercially available from Stepan Company, Northfield, Ill. A process for manufacturing the sulfonated surfactants is described in the above mentioned 1994 paper, the disclosure of which is incorporated herein by reference. As described, the surfactants are prepared by Stepan Company in two basic steps. In Step 1, a triglyceride oil such as coconut, palm kernel, palm, or tallow undergoes methanolysis to form methyl esters and glycerin, usually with the aid of a catalyst such as sodium methylate. Glycerin is physically separated from the esters and is refined for use in other applications. The methyl esters may be further refined by various means, the most common of which is to separate the different alkyl chain lengths by distillation. Step 2 involves the thin-film sulfonation and subsequent neutralization of the methyl esters to form the alpha-sulfo methyl ester mono-salt and relatively small quantities of the alpha-sulfo fatty acid di-salt. It should be pointed out that methyl esters derived from glyceride oils containing olefinic unsaturation may require hydrogenation prior to sulfonation, in order to saturate the olefinic compounds and avoid color body formation.

D. Operation

The method of the present invention may be carried out by preparing a formulation for introducing into the acid at the well site. The formulation preferably has the following composition:

| | Wt % | | |
| --- | --- | --- | --- |
| | Range | Preferred | Most Preferred |
| Sulfonated Surfactant | 3–60 | 15–50 | 30–50 |
| Nonionic Surfactant (HLB of 9.5 and above, preferably HLB of 10–18 | 0–60 | 15–50 | 30–50 |
| Water with 0 to 50 vol % alcohol (e.g. IPA), preferably 10 to 40 vol % alcohol (e.g. IPA) | Balance | Balance | Balance |

Optionally, a water soluble or water dispersable corrosion inhibitor can be used in the formulation at a concentration ranging from 0.1 vol % to 5.0 vol %, preferably 0.1 to 2.0 vol %.

The actives of the Sulfonated Surfactant in the formulation may vary within a wide range depending on several factors, but concentrations of 15 to 50 wt. % will be sufficient for most applications.

The concentration of the Sulfonated Surfactant in the aqueous acid will depend on several factors, including asphaltene content of the crude oil, the tendency of the crude oil and acid to emulsify, temperature, the presence of other additives which may impart synergy to the package. Experimental tests using the selected acid and sample of the crude can be carried out to determine effective treatment rates of the Sulfonated Surfactant. Typically, however, the concentration in the acid solution will be in the range from 10 to 2000 ppm in the acid, preferably 50 to 500 ppm, most preferably 100 to 400 ppm.

In designing the treatment, overtreatment with the Sulfonated Surfactant should be avoided because it can cause the system to form a stable emulsion between the treating liquid and formation fluids. One of the significant advantages of the Sulfonated Surfactant used in the method of the present invention over prior art antisludge surfactants such as Dodecylbenzene Sulfonic Acid (DDBSA) is that it is soluble in the acid solution. DDBSA is not soluble in the acid solution and therefore requires other surfactants or dispersants in the system.

E. Experiments

Commercial antisludge formulations were used in the experiments:

Comparative Samples
(herein referred to
as DDBSA Sample):
  a commercial water base antisludge formulation
  comprising about 43 wt % dodecylbenzene sulfonic acid
  (DDBSA) and including a nonionic surfactant,
  alcohol, and a dispersant.

Formulations containing the Sulfonated Surfactant used in the experiments were aqueous solutions of Surfactant A and Surfactant B.

Surfactant A was sodium alpha-sulfo methyl laurate ester with about 7 wt % disodium alpha-sulfo laurate.

Surfactant B was sodium alpha-sulfo methyl cocoate with about 5–7 wt % disodium-2-sulfococoate.

The active surfactant was about 37 vol. % and the solvent (water) contained less than 4 vol. % methanol.

Test Procedure

An HCl solution (15% HCl) usually already treated with a specified level of $Fe^{3+}$ reduced is mixed with an equal volume of a crude oil (containing trace amounts of water) and a surfactant formulation (DDBSA or Sulfonated Surfactant). The total volume of the mixture is 100 ml. The sample is sheared for 30 seconds at room temperature to intermix the HCl solution that already contains a known ppm level of $Fe^{3+}$ with the crude oil. The sheared mixture is immediately poured into a 100 ml graduated cylinder and observed for the volume of water separation incrementally over a 30 minute time period. The amount of free water (acid) is recorded at selected time intervals. After ten minutes, the samples are put into a water bath at a known or designated temperature (112° F. or 180° C.). The volume of water (acid) separation continues to be recorded incrementally until test completion. After completion of the separation tests (about 30 minutes total), each sample is carefully inverted three times to mix the layers and is poured through a 100 mesh screen. The extent of screen plugging is measured as a percentage of the screen openings plugged. The material that plugs the screen is known as sludge.

The results of tests carried out at 112° F. using the commercial Antisludge Agent are shown in TABLE I wherein the DDBSA surfactant is referred to as "Comp." to indicate comparative results (using Midland Farms Crude Oil, West Texas) and the acid contained 5,000 ppm $Fe^{3+}$ reduced.

TABLE I

| Test No. | Surfactant formulation | Active[1] ml. | | 2 | 6 | 10 | 15 | 30 | Sludge |
|---|---|---|---|---|---|---|---|---|---|
| Blank | 0 | 0 | Free Water (%) | 0 | 0 | 0 | 0 | 0 | 100% |
| | | | Emulsion (%) | 100 | 100 | 100 | 100 | 100 | |
| 1 Comp. | DDBSA | 0.2145 | Free Water (%) | 0 | 0 | 0 | 0 | 0 | tr. |
| | | | Emulsion (%) | 100 | 100 | 100 | 100 | 100 | |

Time (min.)

[1]ml of DDBSA

The same tests were carried out using Surfactant Formulations A and B. The test results are shown in TABLE II.

TABLE II

| Test No. | Surfactant Formulation Type | Actives[1] ml. | | 2 | 4 | 6 | 8 | 10 | 15 | 30 | Sludge |
|---|---|---|---|---|---|---|---|---|---|---|---|
| 1A | A | 0.185 | Free Water (%) | 8 | 12 | 20 | 24 | 24 | 50 | 96 | 0 |
| | | | Emulsion (%) | 92 | 88 | 80 | 76 | 76 | 50 | 4 | |
| 2A | A | 0.185 | Free Water (%) | 26 | 36 | 42 | 50 | 60 | 100 | 100 | 0 |
| | | | Emulsion (%) | 76 | 64 | 58 | 50 | 40 | 0 | 0 | |
| 3B | B | 0.185 | Free Water (%) | — | 36 | 40 | 43 | 46 | 60 | 90 | 0 |
| | | | Emulsion (%) | — | 64 | 60 | 57 | 54 | 40 | 10 | |
| 4B | B | 0.185 | Free Water (%) | 32 | 42 | 52 | — | 74 | 100 | 100 | 0 |
| | | | Emulsion (%) | 68 | 58 | 48 | — | 26 | 0 | 0 | |

Time (mins.)

[1]ml of the Sulfonated Surfactant

Similar tests were carried out, but at temperatures of 180° F. and the HCl contained 10,000 ppm $Fe^{3+}$ reduced. These data are presented in TABLE III.

TABLE III

| Test No. | Surfactant | Active ml. | | 2 | 6 | 10 | 15 | 30 | Sludge % |
|---|---|---|---|---|---|---|---|---|---|
| Blank | 0 | 0 | Free Water (%) | 0 | 0 | 0 | 0 | 0 | 100 |
| | | | Emulsion (%) | 100 | 100 | 100 | 100 | 100 | |
| 4 comp | DDBSA | 0.2145 | Free Water (%) | tr. | tr. | tr. | tr. | tr. | 10 |
| | | | Emulsion (%) | 100 | 100 | 100 | 100 | 100 | |
| 5 comp | DDBSA | 0.1502 | Free Water (%) | 8 | 10 | 10 | 98 | 100 | 0–tr. |
| | | | Emulsion (%) | 92 | 90 | 90 | 2 | 0 | |
| 6 comp | DDBSA | 0.1072 | Free Water (%) | 4 | 6 | 6 | 100 | 100 | 1 |
| | | | Emulsion (%) | 96 | 94 | 94 | 0 | 0 | |
| 5A | A | 0.1850 | Free Water (%) | 20 | 28 | 38 | 100 | 100 | 0 |
| | | | Emulsion (%) | 80 | 72 | 62 | 0 | 0 | |
| 6A | A | 0.1295 | Free Water (%) | 2 | 4 | 4 | 40 | 100 | 0–tr. |

Time (min.)

TABLE III-continued

| Test No. | Surfactant | Active ml. | | 2 | 6 | 10 | 15 | 30 | Sludge % |
|---|---|---|---|---|---|---|---|---|---|
| 7A | A | 0.0925 | Emulsion (%) | 98 | 96 | 96 | 60 | 0 | 3 |
|  |  |  | Free Water (%) | 0 | tr. | 2 | 60 | 100 |  |
| 8B | B | 0.1850 | Emulsion (%) | 100 | 100 | 98 | 40 | 0 | 0 |
|  |  |  | Free Water (%) | 15 | 34 | 70 | 100 | 100 |  |
| 9B | B | 0.1295 | Emulsion (%) |  |  |  |  |  | 0–tr. |
|  |  |  | Free Water (%) | 8 | 10 | 11 | 70 | 100 |  |
| 10B | B | 0.1850 | Emulsion (%) |  |  |  |  |  | 1 |
|  |  |  | Free Water (%) | 8 | 10 | 10 | 60 | 100 |  |

The tests were repeated using Midland Crude oil or Judy Creek Crude oil at the same conditions (180° F.) except the HCl contained 10,000 or 15,000 ppm $Fe^{3+}$ reduced. These data are presented in TABLE IV.

TABLE IV

| Test No. | Surfactant | Active Surfactant ml. | | 2 | 6 | 10 | 15 | 30 | 60 | Sludge % |
|---|---|---|---|---|---|---|---|---|---|---|
| Blank | 0 | — | Free Water (%) | 0 | 0 | 0 | 0 | — | 0 | 100 |
| 7 comp[1] | DDBSA | 0.2145 | Free Water (%) | 0 | 0 | 0 | 0 | — | 90 | 0 |
|  |  |  | Emulsion (%) | 100 | 100 | 100 | 100 | — | 10 |  |
| 8 comp[2] | DDBSA | 0.2145 | Free Water (%) | 36 | 55 | 61 | 100 | 100 |  | 1 |
|  |  |  | Emulsion (%) | 64 | 45 | 38 | 0 | 0 |  |  |
| 9 comp[2] | DDBSA | 0.2145 | Free Water (%) | 32 | 44 | 56 | 100 | 100 |  | tr. |
|  |  |  | Emulsion (%) | 68 | 56 | 44 | 0 | 0 |  |  |
| 10 comp[3] | DDBSA | 0.2145 | Free Water (%) | 32 | 44 | 56 | 100 | 100 |  | tr. |
|  |  |  | Emulsion (%) | 68 | 56 | 44 | 0 | 0 |  |  |
| 11 comp[3] | DDBSA | 0.2574 | Free Water (%) | 25 | 80 | 89 | 100 | 100 |  | tr. |
|  |  |  | Emulsion (%) | 75 | 20 | 11 | 0 | 0 |  |  |
| 11 A[1] | A | 0.1850 | Free Water (%) | 23 | 27 | 28 | 100 | — | 100 | 0 |
|  |  |  | Emulsion (%) | 77 | 73 | 72 | 0 | — | 0 |  |
| 12 B[1] | B | 0.1850 | Free Water (%) | 17 | 22 | 26 | 100 | — | 100 | 0 |
|  |  |  | Emulsion (%) | 83 | 78 | 74 | 0 | — | 0 |  |
| 13 A[2] | A | 0.1850 | Free Water (%) | 42 | 95 | 95 | 100 | 100 |  | 1 |
|  |  |  | Emulsion (%) | 58 | 5 | 5 | 0 | 0 |  |  |
| 14 B[2] | B | 0.1850 | Free Water (%) | 34 | 44 | 56 | 100 | 100 |  | tr. |
|  |  |  | Emulsion (%) | 64 | 56 | 44 | 0 | 0 |  |  |
| 15 A[2] | A | 0.1850 | Free Water (%) | 34 | 95 | 95 | 100 | 100 |  | 1 |
|  |  |  | Emulsion (%) | 66 | 5 | 5 | 0 | 0 |  |  |
| 16 B[2] | B | 0.1850 | Free Water (%) | 14 | 26 | 45 | 100 | 100 |  | 0.5 |
|  |  |  | Emulsion (%) | 86 | 74 | 55 | 0 | 0 |  |  |
| 17 A[3] | A | 0.1850 | Free Water (%) | 34 | 95 | 95 | 100 | 100 |  | 1 |
|  |  |  | Emulsion (%) | 66 | 5 | 5 | 0 | 0 |  |  |
| 18 A[3] | A | 0.2220 | Free Water (%) | 54 | 98 | 98 | 100 | 100 |  | 3 |
|  |  |  | Emulsion (%) | 46 | 2 | 2 | 0 | 0 |  |  |
| 19 B[3] | B | 0.1850 | Free Water (%) | 14 | 26 | 45 | 100 | 100 |  | 0.5 |
|  |  |  | Emulsion (%) | 86 | 74 | 55 | 0 | 0 |  |  |
| 20 B[3] | B | 0.2220 | Free Water (%) | 1 | 1 | 1 | 100 | 100 |  | 0.5 |
|  |  |  | Emulsion (%) | 99 | 99 | 99 | 0 | 0 |  |  |

[1] Midland crude oil; HCl contained 15,000 ppm $Fe^{3+}$ reduced.
[2] Judy Creek crude oil; HCl contained 15,000 ppm $Fe^{3+}$ reduced.
[3] Judy Creek crude oil; HCl contained 10,000 ppm $Fe^{3+}$ reduced.

DDBSA is the standard antisludge agent against which antisludge surfactants are compared. Although DDBSA is an effective antisludge additive for oil field acidizing operations (as demonstrated by the experiments), it has a major disadvantage in such operations: DDBSA is not soluble in the acid solution and therefore must be used in a formulation with other additives such as other surfactants and dispersants to render the DDBSA soluble or dispersable in the acid solution. This adds appreciably to the costs.

The Sulfonated Surfactants used in the present invention performed as well as, and often better than, the DDBSA. However, the solubility of Sulfonated Surfactants in the acid solutions offer significant advantages over DDBSA in terms of ease of use and costs.

In all of the tests under a variety of test conditions, the Sulfonated Surfactant was effective in breaking the emulsions and in substantially eliminating the sludge.

What is claimed is:

1. In a method of acidizing a subterranean oil-bearing formation wherein an aqueous acid solution is injected into the formation, the improvement wherein the aqueous acid solution contains an effective amount of a surfactant to reduce sludge or emulsion formation resulting from the acid solution contacting formation oil, said surfactant having the following formula:

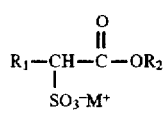

where $R_1$ is a linear or branched alkyl group having from 4 to 24 carbon atoms; $R_2$ is selected from an alkyl group having from 1 to 12 carbon atoms or $M^+$; and $M^+$ is selected from ammonium, amines, ethanol amines or a metal mono or di cation.

2. The method of claim 1 wherein $R_1$ has from 4 to 24 carbon atoms; and $R_2$ is an alkyl group having from 1 to 12 carbon atoms.

3. The method of claim 1 wherein $M^+$ is a metal selected from $Na^+$, $K^+$, $Mg^{++}$, $Ca^{++}$ or ammonium.

4. The method of claim 3 wherein $R_1$ has from 6 to 18 carbon atoms; and $R_2$ is a $C_1$–$C_4$ alkyl group.

5. The method of claim 4 wherein $R_2$ is a methyl group.

6. The method of claim 1 wherein the surfactant is selected from the group consisting of sodium alpha-sulfo methyl laurate, disodium alpha-sulfo laurate, and mixtures thereof.

7. The method of claim 1 wherein the surfactant is selected from the group consisting of sodium alpha-sulfo methyl cocoate, disodium alpha-sulfo cocoate, and mixtures thereof.

8. The method of claim 1 wherein the concentration of the surfactant in the acid solution ranges from 10 to 2000 ppm.

9. The method of claim 1 wherein the acid solution is a mineral acid selected from the group consisting of HCl, HF, and mixtures thereof.

10. The method of claim 1 wherein the acid solution has a pH of less than 3.5.

11. The method of claim 1 wherein $M^+$ and $R_2$ are each $Na^+$.

12. The method of claim 1 wherein $R_1$ is derived from tallow, coconut oil, lauric acid, or tall oil fatty acid.

* * * * *